2,856,391

POLYMERIZATION OF 2-SUBSTITUTED BUTADI-ENE-1,3 HYDROCARBONS WITH A CATALYST COMPRISING A LITHIUM ALKOXIDE AND AN ALKENYL LITHIUM COMPOUND

Hugh E. Diem, Wadsworth, Ohio, assignor to The B. F. Goodrich Company, New York, N. Y., a corporation of New York No Drawing. Application January 9, 1956
Serial No. 557,862

6 Claims. (Cl. 260—94.2)

The present invention relates generally to the polymerization of 2-substituted butadiene-1,3 hydrocarbons. More specifically, the invention relates to the polymerization of isoprene in the presence of a lithium-containing catalyst capable of directive activity to produce an essentially all-cis-1,4 polymeric structure.

Diene hydrocarbons, and especially butadiene-1,3, have been polymerized with alkali metal catalysts such as sodium, with the so-called sodium "alfin" catalysts, with active metal halide Friedel-Crafts type catalysts and with free radical type catalysts in aqueous emulsion systems. All of these known methods result in polymers in which the butadiene units are united in the 1,2-, 3,4- and 1,4-configurations with the 1,2-type predominating in many cases. For example, the sodium metal catalyzed polybutadienes are said to contain from 59 to 100 percent 1,2-type units, depending on the temperature of polymerization. Published data for the sodium "alfin" polyisoprenes ranges from 41 to 55 percent of the 1,2-type structure. For many years it has been believed that the excellent properties of natural rubbers were due to their essentially all 1,4 structure but no method was known which could cause the monomer units to unite in this uniform fashion.

In accordance with the present invention, however, it has been discovered that 2-substituted butadiene-1,3 hydrocarbons may be caused to polymerize to an essentially all-cis-1,4 structure in the presence of a catalyst comprising a lithium alkoxide of a secondary 3 to 6 carbon atom alcohol and an alkenyl lithium compound, with or without a lithium salt. Polymers prepared in this fashion have a moderate molecular weight, a very low gel content and are easily processed by conventional methods. The polymerization starts readily with little or no observable "induction period" and proceeds smoothly to substantial completion in a matter of a few hours. Polyisoprene prepared in this fashion has an essentially all-cis-1,4 structure greatly resembling that of natural rubbers and produces vulcanizates which approach those of natural hevea rubber in properties, especially hysteresis characteristics. By the terms "substantially all-cis-1,4 structure" or "substantially all-cis-1,4 configuration" is meant that at least 90 percent of the 2-substituted butadiene-1,3 units have added to one another in the head-to-tail cis-1,4 fashion.

The catalyst employed in the method of this invention is a multi-component mixture containing as the essential ingredients (1) an alkoxide of lithium derived from a 3 to 6 carbon atom aliphatic secondary alcohol such as isopropanol, 2-methyl butanol, and 2-methyl pentanol and (2) an alkenyl lithium compound derived from an olefin or a substituted olefinic hydrocarbon containing at least three carbon atoms. The alkoxides of lithium may be prepared by reacting metallic lithium or an alkyl lithium compound with an anhydrous alcohol of the class described. The alkenyl lithium compound may be prepared by reacting metallic lithium with an alkyl halide and then treating the resulting alkyl lithium compound with an olefin or a substituted olefinic hydrocarbon, the unsaturated alkene group or radical replacing the alkyl group of the alkyl lithium compound. Olefinic materials which may be employed in the preparation of the alkenyl lithium compound include propylene (preferred), n-butene, n-pentene, n-hexene, n-octene and other 1-monoolefins, styrene, and others.

A preferred catalyst found especially active and found to possess pronounced directive activity is a crude reaction mixture in suspension form made by the steps including (1) reacting in about 1 liter of an inert solvent such as pentane about one gram atom of metallic lithium with about 0.5 gram mole of an alkyl halide such as the n-butyl or n-amyl chlorides or bromides, (2) reacting the step (1) reaction mixture with about 0.3 to 0.35 mole of a 3 to 6 carbon atom secondary aliphatic alcohol such as isopropanol, and (3) treating the step (2) reaction mixture with an olefin such as propylene. The product is a suspension in solvent containing at least three ingredients including (1) a solid, finely-divided lithium alkoxide such as lithium isopropoxide, (2) a dissolved alkenyl lithium compound such as allyl lithium and (3) a finely-divided lithium halide salt. The first two ingredients are believed to be the major active catalytic ingredients while the effect of the third ingredient is believed to be minor in nature. The lithium isopropoxide and allyl lithium type ingredients are believed to furnish a reactive surface on which directive polymerization is initiated and maintained. The actual percentage composition of the above-described crude reaction mixture is not known since its analysis is very difficult and complex. If all three stepwise reactions go to completion, it should theoretically contain about 0.3 mole of lithium isopropoxide, about 0.2 mole of allyl lithium and about 0.5 mole of lithium halide.

In the preparation of the above-described crude catalyst mixture the alkyl halide ingredient may be any such compound in which at least a single halide atom, preferably chlorine or bromine, is united to a carbon atom of a hydrocarbon radical. Illustrative compounds of this class include methyl chloride, methyl bromide, ethyl chloride, propyl chloride, propyl bromide, n-butyl chloride, isobutyl chloride, n-amyl chloride, n-amyl bromide, n-hexyl chloride, n-heptyl chloride, benzyl chloride, cyclohexyl chloride and many others. The term "alkyl" thus is employed as covering aliphatic, aromatic, or cycloaliphatic radicals connected to lithium through a carbon atom. Likewise, as disclosed above, any olefin or substituted 1-monoolefinic hydrocarbon containing at least 3 carbon atoms may be employed in the step (3) reaction including 1-monoolefins such as propylene, n-butene, isobutylene, n-pentene, n-hexene, n-octene and others and 1-monoolefinic hydrocarbons such as styrene, cyclohexene and others.

The proportion of the various ingredients required for efficient polymerization is not known with certainty, rather operative proportions are known only in relative volumetric terms. For example, when using the above-described crude reaction mixture derived from metallic lithium/n-amyl chloride/isopropanol/propylene, as little as 10 cc. of the reaction mixture will efficiently polymerize 100 grams of isoprene in solution in 50 percent pentane at 5° C. to 50° C. As much as 60 cc. of the same solution per 100 grams of isoprene has been utilized without explosive reaction and smaller and larger amounts than these could probably be employed. Crude reaction mixtures made with other materials, other proportions and other ingredients should be used in amounts equivalent to those mentioned above.

Polymerization, according to the method of this invention, is carried out in the substantial absence of oxygen, water, and other active oxygen-containing substances such as alcohols, esters, ketones, aldehydes, phenols, and the like, and in the absence of divalent sulfur compounds, amines, and other impurities and substances capable of reacting with and inactivating the various ingredients of the catalyst system. This is most conveniently carried out by drying and deaerating the equipment, the monomers and solvents, and the catalyst-forming ingredients and then mixing the ingredients and carrying out the polymerization either in evacuated equipment or under an inert atmosphere of nitrogen, argon, helium, hydrocarbon vapors or gases and the like. The polymerization may be carried out in bulk and up to 10 to 20 volumes of an inert solvent or diluent for every one volume of monomers can be employed. Suitable solvents or diluents include the inert hydrocarbons such as the saturated alkanes including propane, butane, pentane, hexane, heptane, octane, or mixtures of such alkanes such as petroleum ether, hydrogenated "Deobase" kerosine, diesel oil, Fischer-Tropsch hydrocarbons and others; benzene hydrocarbons such as benzene, toluene, xylene, and others; and cycloaliphatic hydrocarbons such as cyclohexane.

The temperature of the reaction mixture is preferably maintained at a substantially constant value below about 70° C., with temperatures between 0° C. and 55° C., or lower, being preferred. The pressure in the reaction vessel is not critical since the reaction proceeds satisfactorily at atmospheric pressures, at subatmospheric pressures, or at superatmospheric pressures, with the pressures generated by the monomer and/or solvent vapors alone in a closed vessel being entirely satisfactory.

After polymerization is complete the polymer is obtained either as a solid mass (no solvent) or as a viscous solution of polymer in solvent. In any case it is preferable to treat the polymer to inactivate and/or extract the catalyst. This is most conveniently carried out by cutting or comminuting the solid bulk polymer into small pieces and extracting with alcohol, acetone, water, alcohol-water mixtures, acetone-water mixtures, aqueous solutions of organic and inorganic acids, and the like. The bulk polymer may be milled or ground in the presence of alcohol, water, aqueous acid, etc. to more efficiently extract the lithium-containing compounds. When a polymer solution is the product, work-up and purification is much facilitated since the polymer solution can be added to alcohol, alcohol-solvent, alcohol-water, acetone-water, and other non-solvents for the polymer (but solvents for lithium-containing catalyst ingredients). When this is done, the polymer precipitates out of solution and can be recovered with the liquid filtrate containing the preponderance of the catalyst residues. If desired, the bulk polymer and the more viscous polymer solutions can be dissolved in or diluted with solvent, the resulting solution filtered or separated from solid residues by decantation and then combined with a non-solvent precipitant to precipitate the polymer. Once the solid polymer is precipitated it may be extracted with non-solvents to remove further portions of catalyst residues. All of these extractive treatments are preferably carried out in the presence of rubber antioxidants to prevent polymer degradation due to oxidation. After extraction antioxidants preferably are added before finally drying the polymer in air and/or at elevated temperatures.

The monomers which are directively polymerized to the essentially all-cis-1,4 structure are those containing at least a significant proportion of a butadiene-1,3 hydrocarbon which has a hydrocarbon substituent on the 2-carbon atom, and only on that carbon atom. Thus isoprene (2 - methyl - butadiene - 1,3), 2-ethyl-butadiene-1,3, 2-propyl-butadiene-1,3, 2-phenyl-butadiene-1,3 may be directively polymerized by these catalysts. A surprising feature of this invention is the specificity of the catalysts. For example, the catalysts of this invention will cause the polymerization of butadiene-1,3 but the yield and molecular weight of the polymer will be low. Moreover, and this is most important, the structure of the resulting butadiene-1,3-polymer does not differ materially from that of sodium metal, sodium "alfin," Friedel-Crafts, or free radical catalyzed polybutadiene. In other words, the proportion of 1,2 type structure is quite high.

Furthermore, many of the conjugated 1,3 dienes of more complicated structure, such as 2,3-dimethyl-butadiene-1,3, 2-methyl-pentadiene-1,3, 3-methyl-pentadiene-1,3 and others, polymerized only to a very slight extent or not at all in the presence of the catalysts of this invention. However, other butadiene-1,3 hydrocarbons, particularly butadiene-1,3 itself, may be present in minor proportions in the monomeric material being polymerized. For example, a mixture of isoprene and butadiene-1,3 may be copolymerized according to this invention with the production of copolymers wherein essentially all the isoprene units will be present in the cis-1,4 structure. In such copolymers with butadiene-1,3, for example, the butadiene-1,3 units will be present in random arrangement, in fact, the infrared spectographs of such copolymers greatly resemble those of physical blends containing corresponding proportions of all-cis-1,4 polyisoprene and emulsion-produced polybutadiene. Such copolymers have improved properties, as compared to the corresponding copolymers produced by non-directive catalysts. It is preferred, therefore, to utilize monomeric materials containing a major proportion of isoprene (i. e. above 50 percent) and minor proportions of other conjugated diene comonomers.

The invention will now be described with reference to several specific examples which are intended as being illustrative only.

*Example I*

A crude catalyst is made in this example which is a very active catalyst in its as-obtained condition. To a carefully dried glass reaction vessel filled with a dry helium atmosphere there is introduced about one gram atom of metallic lithium ribbon. About one liter of dewatered, deaerated, liquid mixed octanes (or pentane) is added to the vessel. About 0.5 mole of n-amyl chloride or bromide is then gradually added to the reaction vessel with agitation which agitates while cooling the vessel to maintain the temperature at about —10° C. The resulting mixture is stirred at this temperature for a while to allow time for completion of the reaction. A blue or purple precipitate (which changes to white in air) soon forms which is believed to be lithium chloride or bromide. With the temperature of the reaction mixture at about 0° C., and 0.3 to 0.35 mole of isopropanol is added to the resulting suspension with continued stirring for a time to allow the reaction to proceed toward completion. More precipitate forms during this time, which precipitate is believed to be lithium isopropoxide. Stirring of the suspension is continued for an additional two hours while a gentle current of gaseous propylene is passed over the surface of the reaction mixture. The final crude reaction mixture is a suspension of bluish solid in solvent.

The suspension catalyst prepared above is combined in various proportions with isoprene, with or without solvent, and the polymerization carried out at 5° C. or 50° C. The polymerization is carried out in crown-capped 12 ounce "pop" bottles which are carefully cleaned, rinsed with acetone and dried. A flow of dry nitrogen is introduced to the bottle and the monomeric isoprene is added thereto while maintaining the flow of nitrogen. A measured amount of the crude catalyst suspension is then injected into the bottle by means of a glass syringe and the bottle immediately capped. The bottles are then placed in a rack which rotates in a water bath at either 5° or 50° C.

After removal from the water bath the bottles are opened and the polymers worked up in methanol or ethanol containing 1 percent acetic acid and 2 percent phenyl-beta-naphthylamine. The bulk polymerized samples are obtained as soft masses which are cut up repeatedly in the methanol/acetic acid/PBNA solution and the polymer repeatedly worked and squeezed in the solution. The polymer polymerized in 50 percent solution in pentane is obtained as a viscous solution which is pressured out of the bottles into methanol/acetic acid/PBNA solution. Vigorous agitation of the methanol causes the precipitation of the polymer as a crumb which aggregates into a mass which is then cut up repeatedly in fresh methanol/acetic acid/PBNA. Finally the polymers are squeezed free of excess methanol and dried in a vacuum oven at 40° C. to 50° C.

Several of the bottles prepared as described above, containing 10 to 60 cc. of the crude catalyst suspension per 100 parts of isoprene polymerize with no observable induction period to substantially complete conversion at 50° C. (in 50 percent pentane solution) in as little as one hour. In all cases the polymer contains less than 2 percent gel and the dilute solution viscosities (in benzene) ranges from 2.0 to 7.0 showing moderately high molecular weight. The polymers are soft and are easily formed into smooth sheets on a rubber mill. In contrast, natural rubbers, most sodium polybutadiene rubbers and nearly all sodium "alfin" polymers require considerable mill breakdown and/or the addition of oils, etc. to produce a smooth sheet on the mill. Infrared spectrographs of the polymers of this example indicate that at least 90 percent of the isoprene units have entered the chain in the head-to-tail cis-1,4 configuration. When compounded in a "pure gum" natural rubber recipe and then vulcanized, the essentially all-cis-1,4 polyisoprenes of this example produce strong, snappy vulcanizates having a hot tensile strength (212° F.) of about 1400 pounds per square inch. In contrast, sodium-catalyzed polybutadiene and polyisoprene have comparable values of 300–500 pounds per square inch.

*Example II*

In a similar fashion sodium refluxed and distilled isoprene is polymerized in bulk to substantial completion at 5° C. using 12 to 40 cc. of the crude catalyst suspension described in Example I. At 50° C. polymerization in bulk of isoprene is essentially complete in 5 to 60 minutes employing only 5 to 15 cc. of the same catalyst suspension. In all cases infrared spectrographs of the polymers indicate that at least 90 percent of the isoprene units are cis-1,4.

*Example III*

The amount of pentane solvent employed is varied from 50 percent to 88 percent using 25 cc. of the crude catalyst suspension of Example I with isoprene as the monomer. The reaction time increases with increased dilution while the molecular weight of the polymer seems unaffected in going from 50 to 88 percent solvent. In all cases, however, at least 90 percent of the isoprene units are combined in the head-to-tail cis-1,4 configuration.

*Example IV*

In this example, butadiene-1,3 is substituted for isoprene in the procedure and recipe of Example I. The reaction rate is very slow and very poor yields of low molecular weight polymer are obtained. Infrared spectrographic analysis of the resulting polymer shows that it has a nearly normal structure.

I claim:

1. A method of polymerizing a butadiene-1,3 hydrocarbon having a hydrocarbon substituent and that only on the 2-carbon atom to produce a polymer in which at least 90 percent of the substituted butadiene units are united in the cis-1,4 configuration, which method comprises polymerizing said 2-substituted butadiene-1,3 hydrocarbon in the presence of a catalyst comprising a mixture of (1) a lithium alkoxide and (2) an alkenyl lithium compound.

2. A method as defined in claim 1 wherein said butadiene-1,3 hydrocarbon is isoprene.

3. A method as defined in claim 1 wherein said polymerization is carried out in the presence of an inert diluent.

4. A method of polymerizing a monomeric 2-alkyl substituted butadiene-1,3 hydrocarbon to produce a polymer in which at least 90 percent of the substituted butadiene-1,3 units are united in the cis-1,4 configuration, which method comprises carrying out the polymerization of said substituted butadiene-1,3 hydrocarbon in the presence of an inert hydrocarbon solvent and in the presence of a suspension catalyst prepared by the steps of (1) reacting lithium metal with an alkyl halide, (2) reacting the product of step (1) with a 3 to 6 carbon atom secondary aliphatic alcohol, and (3) reacting the product of step (2) with an olefin containing at least 3 carbon atoms.

5. A method as defined in claim 4 wherein said substituted butadiene-1,3 hydrocarbon is isoprene.

6. A method of polymerizing isoprene to produce a polyisoprene in which at least 90 percent of the isoprene units are united in the cis-1,4 configuration, which method comprises carrying out the polymerization of said isoprene in the presence of a suspension catalyst prepared by the steps of (1) reacting about one mole of metallic lithium with about one-half mole of an alkyl halide, (2) reacting the step (1) mixture with about 0.3 mole of isopropanol, and (3) treating the step (2) reaction mixture with propylene.

References Cited in the file of this patent

UNITED STATES PATENTS

| | | |
|---|---|---|
| 1,058,056 | Harries | Apr. 8, 1913 |
| 2,506,857 | Crouch | May 9, 1950 |

OTHER REFERENCES

Morton: I. & E. Chem., vol. 42, #8, pp. 1488–96, August 1950.

Whitby: Synthetic Rubber, pp. 748–49, Wiley & Sons, N. Y., 1954.